United States Patent [19]
Dixon
[11] 4,246,304
[45] Jan. 20, 1981

[54] INTERNALLY SLOTTED FIRE SEAL

[75] Inventor: Bernard Dixon, Pampisford, England
[73] Assignee: Dixon International Limited, Cambridge, England

[21] Appl. No.: 899,845
[22] Filed: Apr. 25, 1978
[30] Foreign Application Priority Data
Apr. 28, 1977 [GB] United Kingdom ............... 17806/77
[51] Int. Cl.³ .......................... E04C 2/00; E06B 7/16; B32B 1/06
[52] U.S. Cl. ........................................ 428/35; 49/475; 49/493; 52/232; 206/524.1; 277/237 R; 428/920; 428/921
[58] Field of Search ................. 428/920, 921, 83, 122, 428/71, 161, 35, 309, 36; 156/77, 83, 78; 52/232; 49/493, 475, 498, 504, DIG. 1; 277/237 R; 206/524.1, 525

[56] References Cited

U.S. PATENT DOCUMENTS

| | | | |
|---|---|---|---|
| 2,804,398 | 8/1957 | Hooks | 428/921 |
| 3,142,098 | 7/1964 | Oehmig | 49/493 |
| 4,015,386 | 4/1977 | Cook | 428/921 |
| 4,045,930 | 9/1977 | Dixon | 52/232 |
| 4,069,631 | 1/1978 | Nahr | 49/DIG. 1 |
| 4,144,688 | 3/1979 | Dixon | 49/475 |

FOREIGN PATENT DOCUMENTS 1529733 10/1978 United Kingdom .

*Primary Examiner*—Paul J. Thibodeau
*Attorney, Agent, or Firm*—Shapiro and Shapiro

[57] ABSTRACT

A fire-resistant seal for application to a structure, comprising a holder for securing to the structure, the holder comprising a tubular portion, a fire-resistant barrier material which swells under fire-conditions being retained within the tubular portion of the holder, the tubular portion having an elongate actual or incipient opening extending therealong, the holder also comprising a lateral extension, the lateral extension and the tubular portion of the holder together forming a groove, the opening being in the side of the groove and the lateral extension constituting a guard for the opening. The guard may serve to conceal the opening from view and/or to obstruct the introduction of a straight probe into the opening by a tamperer. When the seal is exposed to hot smoke or flame, the fire resistant barrier material swells and exudes through the opening of the seal to form a fire-resistant barrier.

8 Claims, 2 Drawing Figures

INTERNALLY SLOTTED FIRE SEAL

Figure 1:
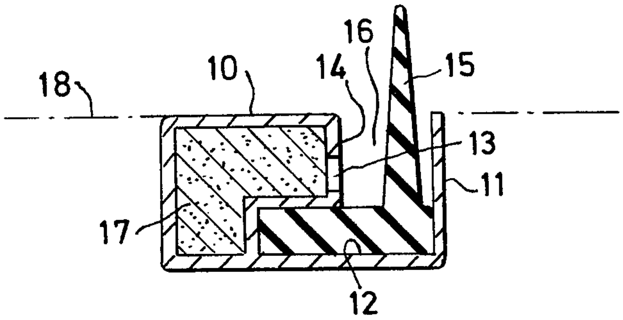

This invention relates to the application of material which swells when exposed to hot smoke or flame, and in the intumesced state constitutes a fire-resistant barrier. Such material is referred to in this specification as fire-resistant barrier material. This material has been used to form a fire-resistant barrier in gaps, e.g. between a door and adjacent structure such as a jamb and between a window and a window frame.

In earlier patent applications we have described a fire-resistant seal for application to a structure comprising an elongate holder for securing thereto and fire-resistant barrier material, as above referred to, retained in the holder. The holder is preferably formed with an opening which extends throughout the length of the holder, through which opening the material effuses during intumescence. Alternatively a foil is provided which seals the opening; or, in place of the opening, a line of weakening is provided in the wall of the holder, the foil or weakened wall rupturing under pressure from the material when it swells under fire conditions.

With the object of improving protection for the material against tampering, for example by a probe pushed in through the opening, and improving mechanical support and retention of the material in the holder over time and against accidental blows after installation, we proposed in our British patent application No. 48795/75, a fire-resistant seal comprising a holder of substantially tubular form for securing to the structure, and a fire-resistant barrier material, which swells under fire conditions, retained in a chamber in the holder, the holder having an external elongate opening extending therealong, and a baffle surface extending within the holder and forming with the holder interior adjacent to the baffle surface a strait coextensive with the length of the opening.

The present invention is an improvement in or modification of the fire-resistant seal according to the foregoing British patent application No. 48795/75.

In accordance with the one aspect of the present invention, there is provided a fire-resistant seal for application to a structure, comprising a holder for securing to the structure, the holder comprising a tubular portion, a fire-resistant barrier material which swells under fire-conditions being retained within the tubular portion of the holder, the tubular portion having an elongate actual or incipient opening extending therealong, the holder also comprising a lateral extension, the lateral extension and the tubular portion of the holder together forming a groove, the opening being in the side of the groove and the lateral extension constituting a guard for the opening.

It will be appreciated that the guard may be effective in one or two ways: in concealing the opening from view and/or in obstructing the introduction of a straight probe into the opening by a tamperer.

In accordance with a second aspect of the invention, there is provided a fire-resistant seal for application to a structure, comprising a holder for securing to the structure, the holder comprising two tubular portions, fire-resistant barrier material which swells under fire conditions being retained within each of the tubular portions, each tubular portion having a respective elongate actual or incipient opening extending therealong, the tubular portions being connected together and laterally spaced by an intermediate portion of the holder, the tubular portions and the intermediate portion together forming a groove, the openings being in opposite sides of the groove and each tubular portion constituting a guard for the opening of the other tubular portion.

As in the first aspect of the invention, each guard may serve to conceal the opposite opening from view and/or to obstruct the introduction of a straight probe into the opening by a tamperer.

In both aspects of the invention, an elastomeric draught excluder element may be retained in the groove and protrude therefrom.

In both aspects of the invention, the holder may be of metal or plastics. Where the holder is of plastics, there may be distributed in the plastics inclusions of metal, graphite or other good thermal conductor in, for example, particle, flake, fibre or strip form to improve upon the thermal conductivity of the plastics.

The fire-resistant barrier material itself may include such a good thermal conductor distributed in the barrier material.

The opening in the or each tubular portion of the seal may be an actual aperture in the wall of the tubular portion or may be an incipient opening, e.g. a line of weakness, which is broken open by the pressure of the fire-resistant barrier material in the holder as intumescence commences in the event of a fire.

Figure 2:
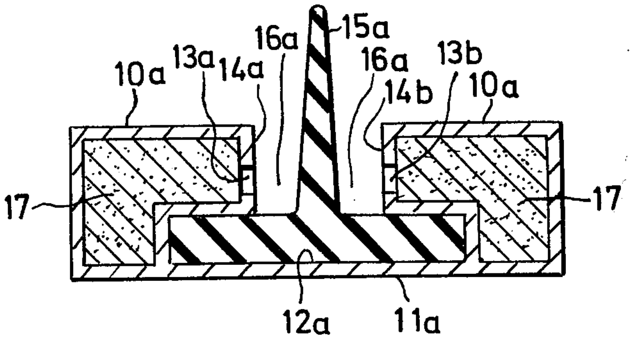

Examples of fire-resistant seal embodying the present invention will now be described with reference to the accompanying drawings, in which:

FIG. 1 is an end view of one form of the seal, which also includes a draught excluder element; and FIG. 2 is a similar view of another form.

Referring to the drawings, the seal shown in FIG. 1 comprises a holder consisting of a tubular portion 10 of modified box-section and a lateral extension 11 of L-section, which forms a groove 12 with the tubular portion. The extension 11 is coextensive with the length of the tubular portion 10 and constitutes a guard for a slot 13 in the side 14 of the groove. The side 14 is re-entrant at the bottom of the groove 12 to receive and retain the foot of an elastomeric draught excluder element 15, a blade of which protrudes from the groove 12. Normally a space 16 exists between the element 15 and the side 14 so that the opening 13, which extends throughout the length of the seal communicates with outside the seal.

The holder 10 contains a solid mass 17 of fire-resistant barrier material including ingredients which intumesce in the temperature range 150° to 250° C.

The seal is installed by inlaying in a prepared groove in a door jamb or other structure, the surface of which is indicated by the broken line 18.

When hot smoke or flame reaches the seal, the holder 10 transmits heat to the mass 17. Intumescence takes place and the fire-resistant barrier material exudes through the opening 13 and the space 16, to the outside of the seal at the structure surface 18. The elastomeric element 15 enlarges in initial stages of decomposition with the heat but will not present a serious obstacle to the exuding barrier material.

The seal shown in FIG. 2 may be regarded as a double form of the seal shown in FIG. 1 but with a vertical plane of symmetry extending along a groove 12*a* of inverted T form, and through a single, correspondingly formed, elastomeric element 15*a*. Thus the seal shown in FIG. 2 comprises a pair of tubular portions 10*a*, one being the mirror image of the other, interconnected by an intermediate portion 11*a*. The intermediate portion 11*a* is coextensive with the length of the seal and defines the bottom of a groove 12*a* the opposite sides of which are provided by the adjacent sides 14*a*, 14*b* of the holders. The extension 11*a* and the sides 14*a*, 14*b* constitute a guard for respective slot openings 13*a*, 13*b* which extend throughout the length of the seal. The extension 11*a* and side 14*a* guard the opening 13*b*, and the extension 11*a* and side 14*b* guard the opening 13*a*. Re-entrant parts of the sides 14*a*, 14*b* receive and retain the foot of the element 15*a*. A blade of the element 15*a* protrudes from the groove 12*a*. Normally there is a space 16*a* existing on each side of the element so that the respective openings 13*a*, 13*b* communicate with outside the seal.

Each of the holders 10*a* in FIG. 2 contains a solid mass 17 of fire-resistant barrier material which is intumescible under heat.

The seal is installed and operates in a manner comparable with the seal of FIG. 1.

The holders of the seals described are extrusions of plastics, e.g. pvc or ptfe or of metal, e.g. iron, aluminium or copper, metal of high thermal conductivity being preferred. If the extrusion is of plastics it may have distributed in it inclusions of metal, graphite or other good thermal conductor in particle, flake, fibre or strip form to improve the thermal conductivity of the plastics.

Similarly the mass 17 may also have such inclusions distributed in it.

The preferred composition of the fire-resistant barrier material is as described in our copending British patent application No. 48795/75.

The holders 10, 10*a* are loaded as described in that application by pumping in the material in slurry form, the conductive inclusion, if desired, already being intermixed with the material; the slurry is dried out with moderate heating (40° C.), and, after solidification, the openings 13, 13*a*, 13*b* are made with a milling cutter.

It may be preferred in some circumstances, e.g. when greater resistance to atmospheric attack on the contents of the holder or to tampering is required, to merely make a line of weakening with the milling cutter which the pressure generated by intumescence of the material could readily break through.

I claim:

1. A fire-resistant seal for application to a structure, comprising a holder for securing to the structure, the holder comprising a tubular portion, an intumescent fire-resistant barrier material being retained within the tubular portion of the holder, one side of the tubular portion having an opening means extending therealong through which the barrier material swells under fire conditions, the holder also comprising a lateral extension including an intermediate portion and a further portion, the lateral extension and said one side of the tubular portion of the holder together forming a groove, said one side of the tubular portion facing the further portion of the lateral extension whereby the lateral extension constitutes a guard for the opening means.

2. A fire-resistant seal for application to a structure, comprising a holder for securing to the structure, the holder comprising two tubular portions, intumescent fire-resistant barrier material being retained within each of the tubular portions, one side of each tubular portion having a respective elongate opening means extending therealong through which the barrier material swells under fire conditions, the tubular portions being connected together and laterally spaced by an intermediate portion of the holder, said sides of the tubular portions and the intermediate portion together forming a groove, the opening means of the respective tubular portions being in opposite facing sides of the groove, whereby each tubular portion constitutes a guard for the opening means of the other tubular portion.

3. A seal according to claim 1, wherein an elastomeric draught excluder element is retained in the groove and protrudes therefrom.

4. A seal according to claim 2, wherein an elastomeric draught excluder element is retained in the groove and protrudes therefrom.

5. A seal according to claim 1, wherein the holder is of plastics in which is distributed inclusions of material of good thermal conductivity.

6. A seal according to claim 2, wherein the holder is of plastics in which is distributed inclusions of material of good thermal conductivity.

7. A seal according to claim 1, wherein the fire-resistant barrier material has distributed therein inclusions of material of good thermal conductivity.

8. A seal according to claim 2, wherein the fire-resistant barrier material has distributed therein inclusions material of good thermal conductivity.

* * * * *